United States Patent
Fuente et al.

(10) Patent No.: US 9,983,935 B2
(45) Date of Patent: *May 29, 2018

(54) STORAGE CHECKPOINTING IN A MIRRORED VIRTUAL MACHINE SYSTEM

(71) Applicant: International Business Machines Corporation, Armonk, NY (US)

(72) Inventors: Carlos F. Fuente, Hursley (GB); James Mulcahy, Manchester (GB); William J. Scales, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 1130 days.

This patent is subject to a terminal disclaimer.

(21) Appl. No.: 14/036,771

(22) Filed: Sep. 25, 2013

(65) Prior Publication Data

US 2014/0025913 A1    Jan. 23, 2014

Related U.S. Application Data

(63) Continuation of application No. 13/980,908, filed on Jul. 22, 2013.

(30) Foreign Application Priority Data

May 23, 2011 (EP) ..................... 11167108

(51) Int. Cl.
*G06F 9/455* (2018.01)
*G06F 11/14* (2006.01)
(Continued)

(52) U.S. Cl.
CPC ........ *G06F 11/1435* (2013.01); *G06F 9/3863* (2013.01); *G06F 9/45533* (2013.01);
(Continued)

(58) Field of Classification Search
CPC ............. G06F 11/1435; G06F 11/1484; G06F 11/2023; G06F 11/2038; G06F 9/3863; G06F 9/45533; G06F 2201/82
See application file for complete search history.

(56) References Cited

U.S. PATENT DOCUMENTS 6,795,966 B1 *  9/2004  Lim ................... G06F 11/1438
                                                                718/1
7,529,897 B1    5/2009  Waldspurger et al.
(Continued)

FOREIGN PATENT DOCUMENTS

CN    1490724 A    4/2004
CN  102057355 A    5/2011

OTHER PUBLICATIONS

Cully et al., "Remus: High Availability via Asynchronous Virtual Machine Replication", NSDI '08, 2008.*
(Continued)

*Primary Examiner* — Lewis A Bullock, Jr.
*Assistant Examiner* — Kevin X Lu
(74) *Attorney, Agent, or Firm* — Francis Lammes; Stephen J. Walder, Jr.; Grant Johnson

(57) ABSTRACT

A method and system are provided for storage checkpointing in a mirrored virtual machine system. The method includes a storage controller receiving a modifying operation to storage from a virtual machine and carrying out the modifying operation in a non-destructive manner by saving the modifying operation data to a checkpointing region of storage and preserving the stored previous data state. The method also includes receiving a checkpoint notification and committing modifying operation data from the checkpointing region and releasing the stored previous data state. If a failover notification is received, the storage controller rolls back the physical storage to match a checkpoint state.

10 Claims, 6 Drawing Sheets

(51) Int. Cl.
*G06F 9/38* (2018.01)
*G06F 11/20* (2006.01)

(52) U.S. Cl.
CPC ...... *G06F 11/1484* (2013.01); *G06F 11/2023* (2013.01); *G06F 11/2038* (2013.01); *G06F 2201/82* (2013.01)

(56) References Cited

U.S. PATENT DOCUMENTS

| | | | |
|---|---|---|---|
| 8,782,632 B1 * | 7/2014 | Chigurapati | G06F 8/65 717/168 |
| 2008/0189432 A1 | 8/2008 | Abali et al. | |
| 2009/0007111 A1 * | 1/2009 | Nelson | G06F 11/3409 718/1 |
| 2010/0122052 A1 | 5/2010 | Waldspurger et al. | |
| 2010/0318991 A1 * | 12/2010 | Venkitachalam | G06F 9/45533 718/1 |
| 2012/0011401 A1 * | 1/2012 | Ranganathan | G06F 11/1484 714/19 |
| 2012/0084782 A1 * | 4/2012 | Chou | G06F 11/1484 718/102 |

OTHER PUBLICATIONS

Unknown Author, "IBM XIV Storage System User Manual Version 10.1", 2009, GC27-2213-02, pp. 41-52.*

Dufrasne et al., IBM Redbook "IBM XIV Storage System: Architecture, Implementation, and Usage", 2009, SG24-7659-01, pp. 23-42.*

Unknown Author, "IBM XIV Storage System—Theory of Operation", 2009, GA32-0639-03, pp. 9-31.*

Dufrasne et al., IBM Redbook "IBM XIV Storage System Business Continuity Functions", 2009, SG24-7759-05, pp. 11-54.*

Marc Stimer, "Using Different Types of Storage Snapshot Technologies for Data Protection," searchdatabackup.techtarget.com/tip/Using%ADdifferent%ADtypes%ADof%ADstorage%ADsnapshot%ADtechnologies%ADfor%ADdata%ADprotection2/7, 2009.*

Cully, Brendan et al., "Remus: High Availability via Asynchronous Virtual Machine Replication", Department of Computer Science, The University of British Columbia, Nov. 27, 2015, pp. 1-24.

Garimella, Neeta, "Understanding and Exploiting Snapshot Technology for Data Protection, Part 1: Snapshot Technology Overview", Developer Works, Technical Topics, Tivoli, Technical Library, Dec. 7, 2015, pp. 1-8.

U.S. Appl. No. 13/980,908.

Chen, Chih-Ho et al., "Low Overhead Incremental Checkpointing and Rollback Recovery Scheme on Windows Operating System", 3rd International Conference on Knowledge Discovery and Data Mining, WKDD 2010, 2010, pp. 268-271.

* cited by examiner

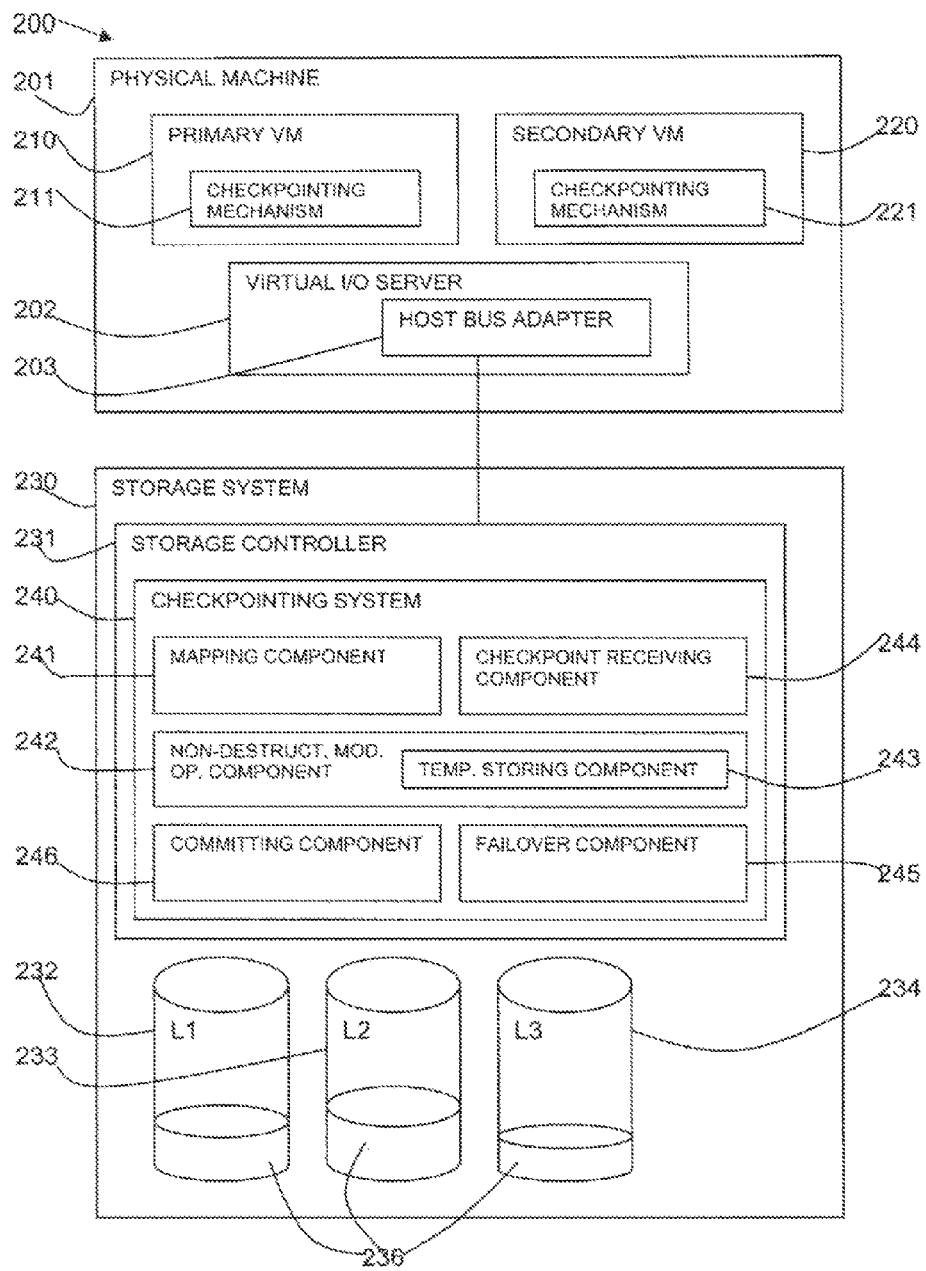

STORAGE CHECKPOINTING IN A MIRRORED VIRTUAL MACHINE SYSTEM

BACKGROUND

This invention relates to the field of checkpoint-based high-availability solutions in mirrored virtual machines. In particular, the invention relates to storage writes in mirrored virtual machine checkpointing.

A virtual machine mirror is a way of running a virtual machine (VM) such that if a hardware failure occurs, it can continue execution from the mirror that exists on a second physical machine or a logical partition of the same physical machine. The virtual machine state is exchanged between a primary virtual machine and a secondary virtual machine. This is done by means of checkpointing the primary virtual machine by capturing the state of the first virtual machine and transferring it to the secondary virtual machine. The aim is to reduce downtime caused by hardware failure in a computing system.

These checkpoint-based systems, are built on top of existing virtual machine hypervisors and extend the hypervisor's functionality by capturing modifications to a primary virtual machine's memory state and transferring it over to a secondary computing system at very frequent intervals (for example, every 25 ms).

The core idea is that, should the primary computing system fail, the secondary computing system has a virtual machine in almost the precise same state ready for immediate execution. When this secondary virtual machine is activated, it starts to receive and transmit network packets and perform disk I/O just as the virtual machine did when it ran on the primary computing system. The effect from the outside world is of a minor (milliseconds) discontinuation of activity; similar to if the network connection to the virtual machine had been briefly disconnected and reconnected.

Because the virtual machines are not kept in complete lockstep, but only synchronize on these frequent checkpoints, writes by the primary virtual machine to disk have to be handled specially. This is because, to ensure correctness, the secondary virtual machine must not only resume from a valid checkpoint of the primary virtual machine's state, but disk storage must also be in precisely the same state. In effect, the secondary virtual machine is the primary virtual machine "rolled back" some number of milliseconds, to the last checkpoint.

Checkpoint-based high-availability is a technique whereby a virtual machine running on a host machine (the "primary host") regularly (for example, every 25 ms) mirrors its processor and memory state onto another host machine (the "secondary host"). The primary and secondary host machines may be logical partitions of the same physical machine.

The basic approach to mirroring process involves the following steps:
  tracking changes to the memory of the virtual machine;
  periodically stopping the virtual machine;
  sending these changes over a network to the secondary host;
  waiting for the secondary host to acknowledge receipt of the memory and CPU state update; and
  resuming the virtual machine.

This ensures that the secondary host is able to resume the workload with no loss of service should the primary host suffer a sudden hardware failure. This process is known as "failover".

In a very naive implementation, network and disk I/O must cause checkpoints to be performed. This is because the primary host may not release a network packet or modify a block on disk, only to fail, and have the secondary host resume from the last checkpoint and re-transmit the packet again, or read the now erroneous block again. Packet transmission must only occur once, and the disk state must match that at the time the checkpoint was taken.

Concerning disk I/O, a naive implementation of "checkpoint-on-write" would perform a checkpoint on the primary just prior to issuing the I/O operation to the disk controller. One basic optimisation to "checkpoint-on-write" is that of combining multiple writes together, and checkpointing a few writes in one go. Conventionally, the virtual machine will track these I/O operations as pending until the checkpoint has completed and the I/O operating has been issued to, and completed, on the disk subsystem. This knowledge of pending I/O operations is exchanged as part of the checkpoint state, along with the CPU and memory state of the virtual machine. An example can be seen in FIG. 1.

Referring to FIG. 1, a diagrammatic illustration 100 of checkpoint-on-write as known in the prior art is provided in which the progression of writes through time is shown progressing vertically down the illustration 100. A primary virtual machine 110 writes to disk blocks 120. Changed blocks are shown by diagonally hashed shading.

In this illustration 100, a first block 131 of a sequence of blocks 130 is modified by the primary virtual machine 110, followed by a second block 132. The modifications to the first and second blocks 131, 132 are held 141, 142 and written 143 to the disk blocks 120 at the next checkpoint 150. An acknowledgement 144 is sent by the disk blocks 120 to confirm the writes.

After the checkpoint 150, a further third block 133 is modified, followed by a fourth block 134. The modifications to the third and fourth blocks 133, 134 are held 145, 146 and written 147 to the disk blocks 120 at the next checkpoint 151. An acknowledgement 148 is sent by the disk blocks 120 to confirm the writes.

The problem with this approach is the additional latency that it adds to write operations. A write operation does not complete successfully until after the next checkpoint, and so in a system where checkpoints are taken every 25 ms, this would add an average of 12.5 ms to every write.

If the primary host were to fail between this acknowledged checkpoint and a future checkpoint, it may be difficult to determine if the pending I/O operations were complete. As such, all pending I/O operations are re-issued, forcing the disk subsystem to reflect the correct state.

A straightforward optimisation to the above is to ignore any I/O operations that do not modify the on-disk state (i.e. a simply read operation). These can be allowed directly through without a checkpoint being performed, since they do not modify any state.

Two key drawbacks with the described approach are as follows:
  1. The storage I/O operations of the virtual machine must be intercepted and delayed until the next checkpoint is exchanged with the secondary machine. This increases the latency of I/O operations.
  2. In anything but the most naive implementation, operations that do not modify storage (such as a simple read) must be distinguished from those operations that do modify storage. This removes the latency overheads from those operations, but at the cost of having to inspect, and understand the semantics of each I/O operation as it is performed.

Therefore, there is a need in the art to address the aforementioned problem.

SUMMARY

According to a first aspect of the present invention there is provided a method for storage checkpointing in a mirrored virtual machine system, comprising a storage controller: receiving a modifying operation to storage from a virtual machine; carrying out the modifying operation in a non-destructive manner by saving the modifying operation data to a checkpointing region of storage and preserving the stored previous data state; receiving a checkpoint notification; and committing modifying operation data from the checkpointing region and releasing the stored previous data state.

According to a second aspect of the present invention there is provided a system for storage checkpointing in a mirrored virtual machine system, comprising: a processor; a storage controller including: a mapping component of a logical drive addressable by a client to physical storage; a non-destructive modifying operation component for carrying out received storage modifying operations in a non-destructive manner, including: a temporary storing component for saving the modifying operation data to a checkpointing region of storage and preserving the stored previous data state; a checkpointing receiving component for receiving notification from a virtual machine of a checkpoint; and a committing component for committing modifying operation data from the checkpointing region and releasing the stored previous data state.

According to a third aspect of the present invention there is provided a computer program stored on a computer readable medium and loadable into the internal memory of a digital computer, comprising software code portions, when said program is run on a computer, for performing the method of the first aspect of the present invention.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 2A and 2B are block diagrams of embodiments of a system in accordance with the present invention;

DETAILED DESCRIPTION

Figure 1:
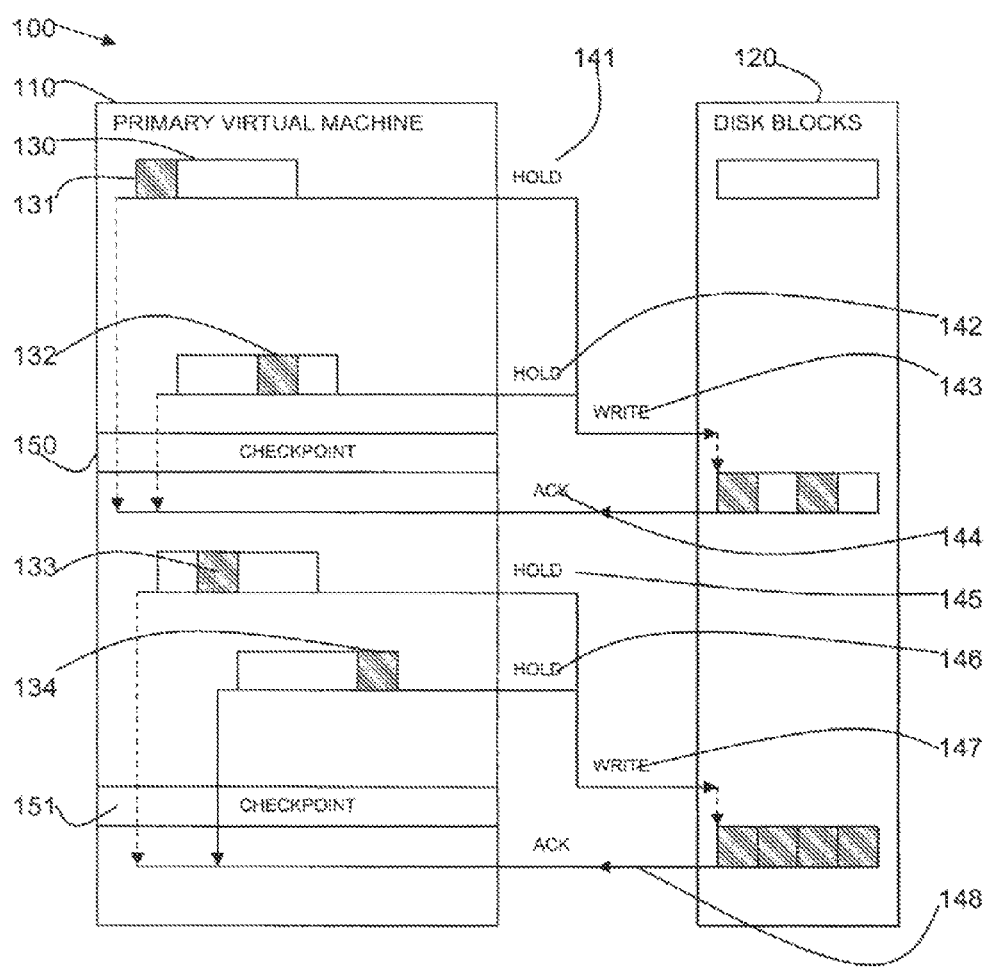
FIG. 1 is a schematic diagram of a process of checkpoint-on-write as known in the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method, system, and computer program product are described in which, instead of intercepting I/O operations for checkpointing at the virtual machine, they are passed to the underlying storage controller. The operations appear to complete normally; however, operations that modify the on-disk state are performed by the storage controller in a non-destructive manner, preserving the original blocks (for example, by Copy-On-Write (COW) or Redirect-On-Write (ROW) mechanisms).

When a checkpoint occurs, the storage controller is notified of this, and provided with an associated checkpoint identifier. The modifying operations can then be committed by the storage controller and the original blocks no longer preserved. Following a checkpoint, the execution of the virtual machine resumes and I/O operations continue to flow. This ensures that at any given point in time the storage controller can revert the on-disk state to that matching an identified checkpoint.

This mechanism allows the client to experience high performance I/O, with I/O operations completing without the additional latency introduced by the checkpoint-on-write approach.

Should failover occur, the storage controller is instructed to revert the storage to an identified checkpoint stage prior to execution resuming.

A "logical drive" is provided as storage presented by a storage controller over a given LUN (Logical Unit). A standard logical drive contains a set of blocks which make up the storage addressable by the client.

In the described system, the storage controller makes provisions for additional storage above and beyond those storage blocks addressable by the client. This additional storage is used to allow preservation of modified blocks until a checkpoint is complete. In the following text, this additional storage is referred to as the "checkpoint region", containing "checkpointing blocks".

In the described system, modified blocks are not directly overwritten by the client. The original blocks are preserved until the next checkpoint.

Clients are provided with a mechanism to associate a given point-in-time view of a logical drive with an identifier, the "checkpoint id". At each checkpoint interval, the client (or an agent on behalf of the client, such as a hypervisor) associates the current disk state with a new checkpoint id. The described method and system support multiple concurrent checkpoints.

Should failover occur, the storage controller is instructed to roll the disk state back to that matching a given checkpoint id.

In one embodiment, the checkpointing region is provided as additional on-physical-disk storage. In this embodiment, "Copy-on-write" or "re-direct-on-write" are employed to preserve the original block until the next checkpoint.

In another embodiment, the checkpointing region is provided as non-volatile storage, such as the storage controller's write cache. In an embodiment which utilised non-volatile storage to persist the checkpointing data, the metadata/directory structures could contain an additional value of the checkpointing id. As an example, rather than the cache indexing by LBA (Logical Block Address), it could index by LBA and CheckpointID. When a checkpoint is committed, and blocks with that CheckpointID would then be "destaged" and written out to physical disk.

This embodiment is not constrained to managing the writes on a block-by-block basis. A non-volatile storage approach, for example, would be likely to do this on a finer granularity, for example, by sector (which is often 512 bytes in a storage controller).

Figure 2B:
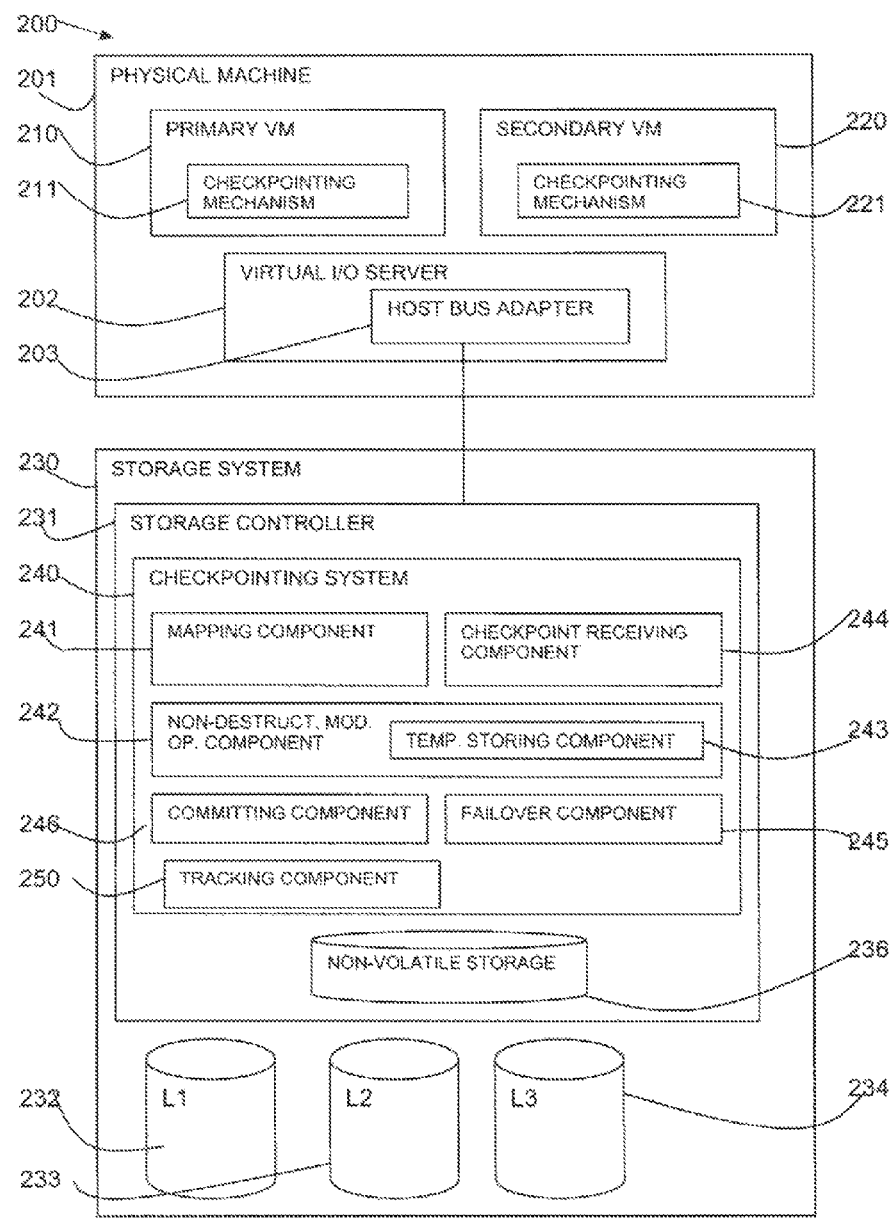

Referring to FIGS. 2A and 2B, block diagrams show example embodiments of the described system 200.

The system 200 includes a primary virtual machine 210 and a secondary virtual machine 220 providing a mirrored high-availability system. In one embodiment, the primary and secondary virtual machines 210, 220 run on separate physical machines (not shown). In an alternative embodiment, the primary and secondary virtual machines 210, 220 may be LPARs (logical partitions (virtual computing platform)) on a same physical machine 201 (shown). Each primary and secondary virtual machine 210, 220 may have a hypervisor including input/output management of network packets and storage writes.

The virtual machines 210, 220, or agents such as a hypervisor, may include checkpointing mechanisms 211, 221. In the described system 200, the checkpointing mechanism 211, 221 of a virtual machine 210, 220 associates a given point-in-time view of a logical drive with an identifier which is used to identify a checkpoint. At each checkpoint interval, the checkpointing mechanism 211, 221 associates the current disk state with a new checkpoint id.

The primary and secondary virtual machines 210, 220 may send operations to a storage system 230. A virtual I/O server 202 may be provided with a host bus adapter 203 for communicating with a storage system 230. In one embodiment, a mechanism may be provided for sharing hardware between the virtual machines 210, 220 such that each virtual machine 210, 220 thinks it is talking directly to its own storage system adapter, when a single storage system adapter is used with a single root IO virtualization.

A storage system 230 is provided. In one embodiment, the storage system 230 may be a storage area network (SAN), for example, a Fibre Channel SAN. The storage system 230 includes a storage controller 231 which manages the centralized storage of the storage system 230. Storage devices 232-234 are provided which are presented as logical drives over a given logical unit (LUN). A logical drive contains a set of blocks which make up storage addressable by a client.

The storage controller 231 also includes a checkpointing system 240. The checkpointing system 240 may include a mapping component 241 for mapping logical drive addresses to the physical storage devices 232-234. The checkpointing system 240 may include a non-destructive modifying operation component 242 including a temporary storing component 243 for saving modifying operation data to a checkpointing region of storage 236 and preserving stored previous data until a checkpoint is committed.

The checkpointing mechanism 211, 221 tracks a checkpointing id per virtual machine. This id is provided from a primary virtual machine 210 to a secondary virtual machine 220 as part of the checkpoint state that is sent to the secondary. It is also sent to the checkpointing system 240 of the storage controller 231.

The storage controller 231 also includes a checkpointing receiving component 244 for receiving notification from a virtual machine of a checkpoint with a checkpoint identifier. Such notifications may be received "in-band", that is to say that they arrive over the same communication channel as the storage reads/writes themselves. Alternatively, out-of-band communication of checkpoint requests could also be implemented.

The storage controller 231 also includes a committing component 246 for committing modifying operation data from the checkpointing region and releasing the stored previous data state. The storage controller 231 also includes a failover component 245 for receiving notification from a virtual machine of a failover and rolling back the physical storage to match an identified checkpoint state.

In the described system, additional storage is provided as a checkpointing region of storage 236. The checkpointing region 236 is where write operation data is stored before it is confirmed by a checkpoint. This may take various different forms.

In one embodiment shown in FIG. 2A, the checkpointing region 236 is an area of additional blocks at the storage devices such as physical drives. In this case, when a checkpoint is committed, the checkpointing region becomes the committed data, and the previous data area becomes the new checkpointing region. This embodiment is described in more detail in relation to FIG. 5.

In another embodiment shown in FIG. 2B, the checkpointing region 236 may be provided as non-volatile storage, for example, in the storage controller's 231 write cache. When a checkpoint is committed the data is written from the write cache to the storage devices 232-234.

In the embodiment of FIG. 2B which utilised non-volatile storage to persist the checkpointing data, the metadata/directory structures may contain an additional value of the checkpointing id. As an example, rather than the cache indexing by LBA (Logical Block Address), it could index by LBA and CheckpointID. When a checkpoint is committed, and blocks with that CheckpointID would then be "destaged" and written out to physical disk 232-234.

In the embodiment of FIG. 2B, the checkpointing system 240 at the storage controller 231 may include a tracking component 250 for LBA, Checkpoint ID tracking.

The storage controller 231 may continue to use write caching, even if the non-volatile storage checkpointing region in the form of the write cache is used.

A checkpointing region 236 may be shared across multiple logical drivers and dynamically allocated as required, based upon the I/O throughput from the host. There are a number of options for implementations which may depend on whether the system is implementing non-volatile storage checkpointing, or on-physical-disk COW/ROW checkpointing.

Options may include:
Require that the host enables checkpointing per LUN, and as part of that, allow it to negotiate/request how much storage is allocated (and perhaps how).
Do not require the above, and just allocate additional storage as required.
Do not require negotiation, but have an internal, pre-allocated set of checkpointing storage which is shared across all checkpointing LUNs.

Figure 3:
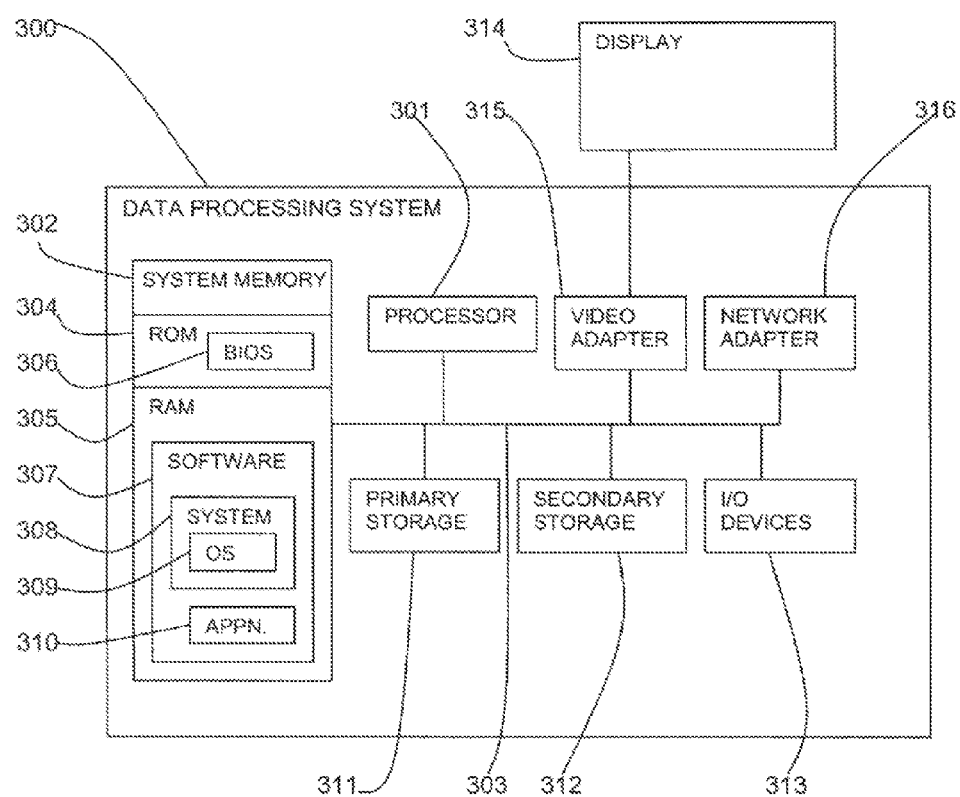
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308 executing an operating system 309. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
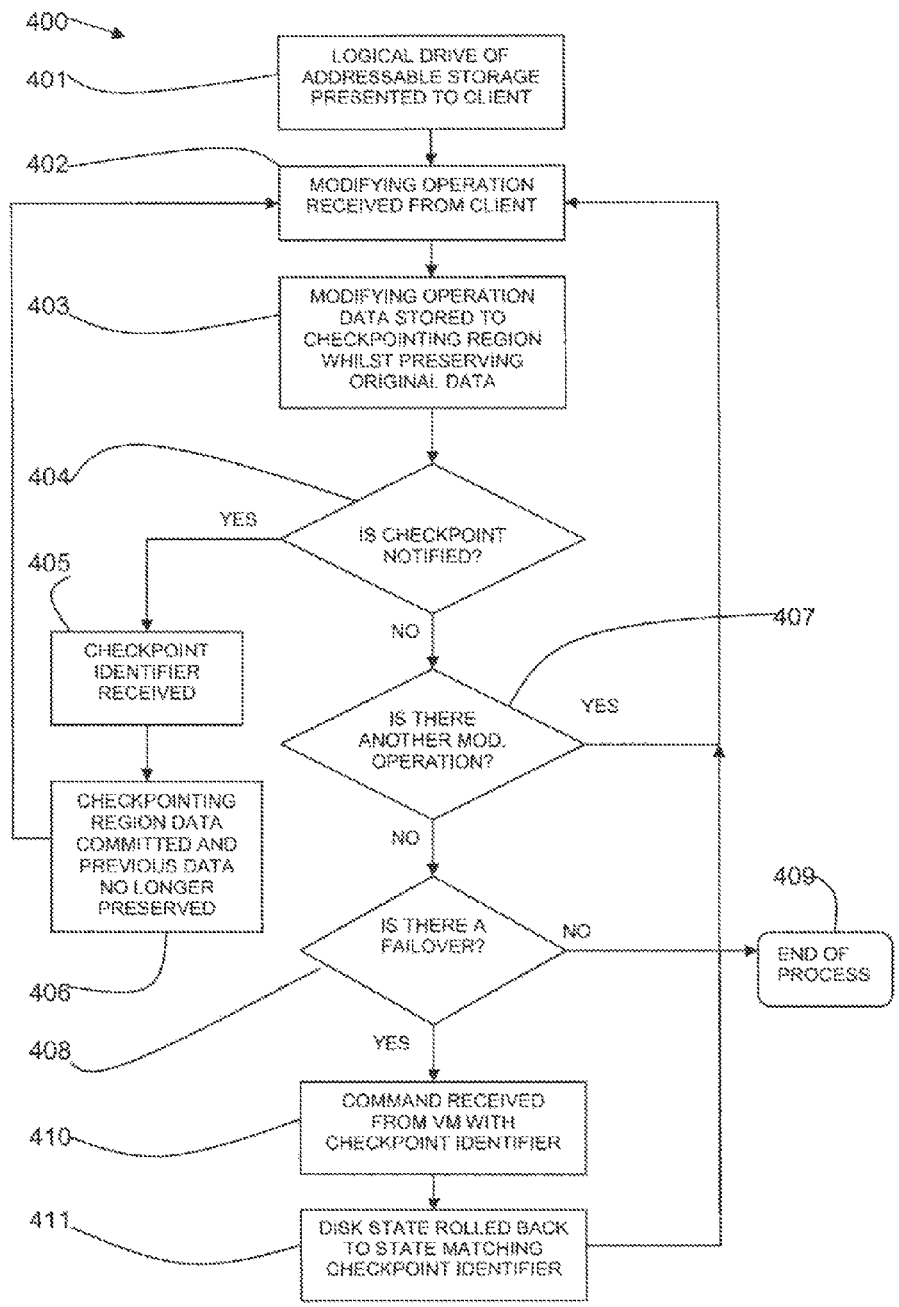
FIG. 4 is a flow diagram of a method in accordance with the present invention.

Referring to FIG. 4, a flow diagram 400 shows an example embodiment of the described method as carried out at a storage controller.

A logical drive of addressable storage is presented 401 to a client, i.e., the primary and secondary virtual machines. A modifying operation (for example, a write operation or other form of operation that modifies the on-disk state) is received 402 from a virtual machine of the client. The modifying operation data is stored 403 to a checkpointing region of storage whilst preserving the original data.

It is determined 404 if there is a checkpoint notified by the virtual machine. If so, a checkpoint identifier is received 405 from the virtual machine. The checkpointing region data is committed 406 and the previous data is not longer preserved. This may be carried out in various ways depending on the form of the checkpointing region storage.

For example, in an embodiment with non-volatile checkpointing region, a "CheckpointID" may be used to track which checkpoint a block/sector is for. When a checkpoint is committed, that CheckpointID field may be set to a special "invalid" value, indicating that it is no longer part of a checkpoint, and has been committed.

The method then continues by looping to receive further modifying operations at step 402.

If it is determined 404 that there is no checkpoint, it is determined 407 if there is another modifying operation. If it is determine 407 that there is another modifying operation, the method loops to repeat steps 402 and 403. If it is determine 407 that there not another modifying operation, it is determined 408 if there is a failover. If it is determined 408 that there is not a failover, the method ends 409.

If it is determined 408 that there is a failover, a command is received 410 from the secondary virtual machine to revert to a storage state for a given checkpoint identifier. The storage controller rolls the disk state back 411 to that matching a given checkpoint identifier. Further operations are then received from the secondary virtual machine.

The method supports creating multiple concurrent checkpoints. Generally, a new checkpoint may be created, then the oldest checkpoint deleted a short period later. A storage controller may receive a query to determine which checkpoints exist at a given time.

Figure 5:
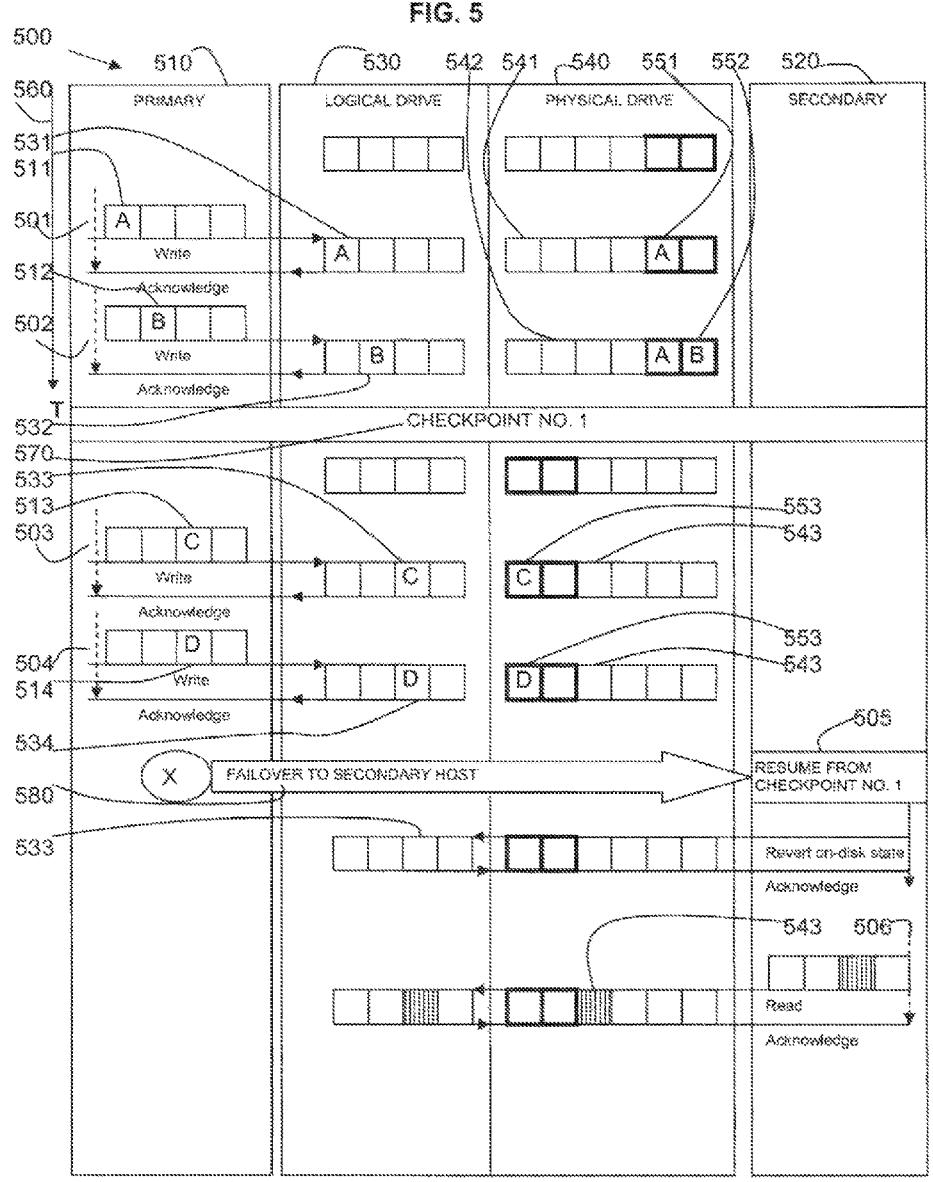
FIG. 5 is a schematic diagram of a process of checkpointing in accordance with the present invention.

Referring to FIG. 5, a schematic flow diagram 500 shows an example operation of the described method with a time axis 560 going down the page. A primary virtual machine 510 and a secondary virtual machine 520 are provided. A logical drive 530 presents addressable storage to the virtual machines 510, 520. Physical drives 540 include physical storage areas including an additional checkpointing region (shown with a bold outline).

In this example embodiment, a storage controller is presenting a small, four block logical drive to the primary virtual machine 510. Behind the scenes, on the physical drives 540, the storage controller has provisioned an additional two blocks of storage as a checkpointing region of storage. Note that in this simplified example, it is assumes that the virtual machine is always writing in block sized chunks and as such, a redirect-on-write approach is employed; i.e. writes to storage always go to an available checkpointing block.

A write operation "A" 501 is performed on the first block 511. The view of the logical drive 530 is updated to show the write operation 531, but the underlying physical block 541 is not modified thereby preserving the existing data. Instead, the data is written to a checkpointing block 551 instead. If the storage controller's write cache is used as the checkpointing region, it may continue to use write caching. This example ignores the presence of a write cache but the described method does not preclude its use.

Another write operation "B" 502 is performed this time modifying the second block 512, which is again shown on the logical drive 532. Again, the original block 542 is left intact on the physical drive and the new data written to a checkpointing block 552 instead.

A checkpoint (ID #1) 570 occurs. At this point, it is no longer possible to revert to an on-disk state prior to this point in time. The checkpoint id (ID #1) is passed to the secondary virtual machine 520 from the primary virtual machine 510 together with the virtual machine state and the list of pending I/O operations.

The physical blocks 541, 542 which were previously being preserved are now marked as available, and become our checkpointing blocks for subsequent writes.

A write operation "C" 503 is performed, this time modifying the third block 513 on the logical drive. Again, the logical drive block 533 is shown, but the underlying physical block 543 is preserved and the first available checkpointing block 553 is written to instead.

Another write operation "D" 504 to the same third block 514 is performed. The logical drive block 534 is overwritten. In this situation, the same checkpointing block 553 is overwritten whilst still maintaining the physical block 543.

A failover 580 occurs. The primary virtual machine 510 is no longer operational, and the secondary virtual machine 520 state matches and older version of the on-disk state.

The secondary virtual machine 520 issues a command 505 to the storage controller to revert the logical drive to the state associated with Checkpoint #1 570. The logical-physical mapping of blocks is reverted to match the state following Checkpoint #1 570.

The blocks 553 which were subsequently modified after Checkpoint #1 570 are effectively discarded and they become available checkpointing blocks once again.

The secondary virtual machine 520 performs a read 506 from the third logical block 533. This returns data from the 3rd physical block 543 and not the data written by the primary virtual machine 510 which was written to the checkpointing block 553 prior to failover.

The described method and system delegates the state of I/O operations to a storage controller and carries out modifying operations in an non-destructive manner before a checkpoint occurs. A checkpoint identifier may be provided to the storage controller in case a failover occurs.

The described method and system allows a client to experience high performance I/O, with I/O operations completing without the additional latency introduced by the checkpoint-on-write approach.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for storage checkpointing in a mirrored virtual machine system, comprising a storage controller:
   receiving, by the storage controller in a storage system, a modifying operation to modify data stored at a physical storage location within the storage system from a first virtual machine;
   carrying out, by the storage controller, the modifying operation in a non-destructive manner by saving modifying operation data of the modifying operation to a new checkpointing region of the physical storage location that is appended to the data stored at a previous checkpointing region in the physical storage location thereby preserving a stored previous data state of the data;
   receiving, by the storage controller, a start new checkpoint notification;
   responsive to receiving the start new checkpoint notification, saving, by the storage controller, subsequent modifying operation data in the previous checkpointing region, wherein the start new checkpoint notification is received and completed before new modifying operations are submitted by the first virtual machine;
   receiving, by the storage controller, a retire previous checkpoint notification;
   copying, by the storage controller, an associated state of the new checkpointing region from the first virtual machine to the second virtual machine;
   responsive to receiving the retire previous checkpoint notification, committing, by the storage controller, the modifying operation data from the new checkpointing region to the appended physical storage location and releasing the data associated with the previous checkpointing region and modified by the modifying operation data as the new checkpointing region, wherein the retire previous checkpoint notification is received only when the associated state of the new checkpointing region has been completely transferred from the first virtual machine to a second virtual machine; and
   resuming, by the storage controller, the implementation of the other modify operations from the first virtual machine.

2. The method as claimed in claim 1, including:
   supporting, by the storage controller, multiple checkpoints, wherein the new checkpoint notification and the retire previous checkpoint notification each include a checkpoint identifier for distinguishing from other checkpoints.

3. The method as claimed in claim 1, including:
   receiving at the storage controller a query to determine which checkpoints exist at a given time.

4. The method as claimed in claim 1, including:
   presenting, by the storage controller, a logical drive of the storage addressable by a client;
   saving, by the storage controller, the modifying operation data of the modifying operation on the logical drive; and
   maintaining, by the storage controller, a mapping of the logical drive to the physical storage in the new checkpointing region.

5. The method as claimed in claim 4, including:
   receiving, by the storage controller, a failover notification; and
   rolling, by the storage controller, back the physical storage to match a checkpoint state.

6. The method as claimed in claim 4, including:
   receiving, by the storage controller, a failover notification with a checkpoint identifier;
   rolling, by the storage controller, back the physical storage to match an identified checkpoint state;
   reverting, by the storage controller, the mapping of the logical drive to the physical storage following the identified checkpoint; and
   discarding, by the storage controller, the modifying operation data in the new checkpointing region.

7. The method as claimed in claim 6, wherein the checkpoint identifier associates the checkpoint identifier with a point-in-time view of the logical drive.

8. The method as claimed in claim 1, wherein carrying out the modifying operation in the non-destructive manner includes one of: performing a copy-on-write operation or performing a redirect-on-write operation.

9. The method of claim 1, wherein, responsive to receiving the retire previous checkpoint notification and prior to committing the modifying operation data from the new checkpointing region to the appended physical storage location and releasing the data associated with the previous checkpointing region and modified by the modifying operation data as the new checkpointing region, the method further comprises:

pausing, by the storage controller, implementation of other modify operations from the first virtual machine; and responsive to the associated state of the new checkpointing region being completely transferred from the first virtual machine to the second virtual machine, committing, by the storage controller, the modifying operation data from the new checkpointing region to the appended physical storage location and releasing the data associated with the previous checkpointing region and modified by the modifying operation data as the new checkpointing region.

10. A method for storage checkpointing in a mirrored virtual machine system, comprising a storage controller:

receiving, by the storage controller in a storage system, a modifying operation to modify data stored at a physical storage location within the storage system from a first virtual machine;

carrying out, by the storage controller, the modifying operation in a non-destructive manner by saving modifying operation data of the modifying operation to a new checkpointing region of the physical storage location that is appended to the data stored at a previous checkpointing region in the physical storage location thereby preserving a stored previous data state of the data;

receiving, by the storage controller, a start new checkpoint notification; and responsive to receiving the start new checkpoint notification, saving, by the storage controller, subsequent modifying operation data in the previous checkpointing region, wherein the start new checkpoint notification is received and completed before new modifying operations are submitted by the first virtual machine;

receiving, by the storage controller, a retire previous checkpoint notification; and responsive to receiving the retire previous checkpoint notification, pausing, by the storage controller, implementation of other modify operations from the first virtual machine;

copying, by the storage controller, the associated state of the new checkpointing region from the first virtual machine to a second virtual machine;

responsive to the associated state of the new checkpointing region being completely transferred from the first virtual machine to the second virtual machine, committing, by the storage controller, the modifying operation data from the new checkpointing region to the appended physical storage location and releasing the data associated with the previous checkpointing region and modified by the modifying operation data as the new checkpointing region; and resuming, by the storage controller, the implementation of the other modify operations from the first virtual machine.

\* \* \* \* \*